Nov. 3, 1959  L. E. SCHWARTZ  2,910,785
TEACHING DEVICE
Filed Jan. 31, 1955
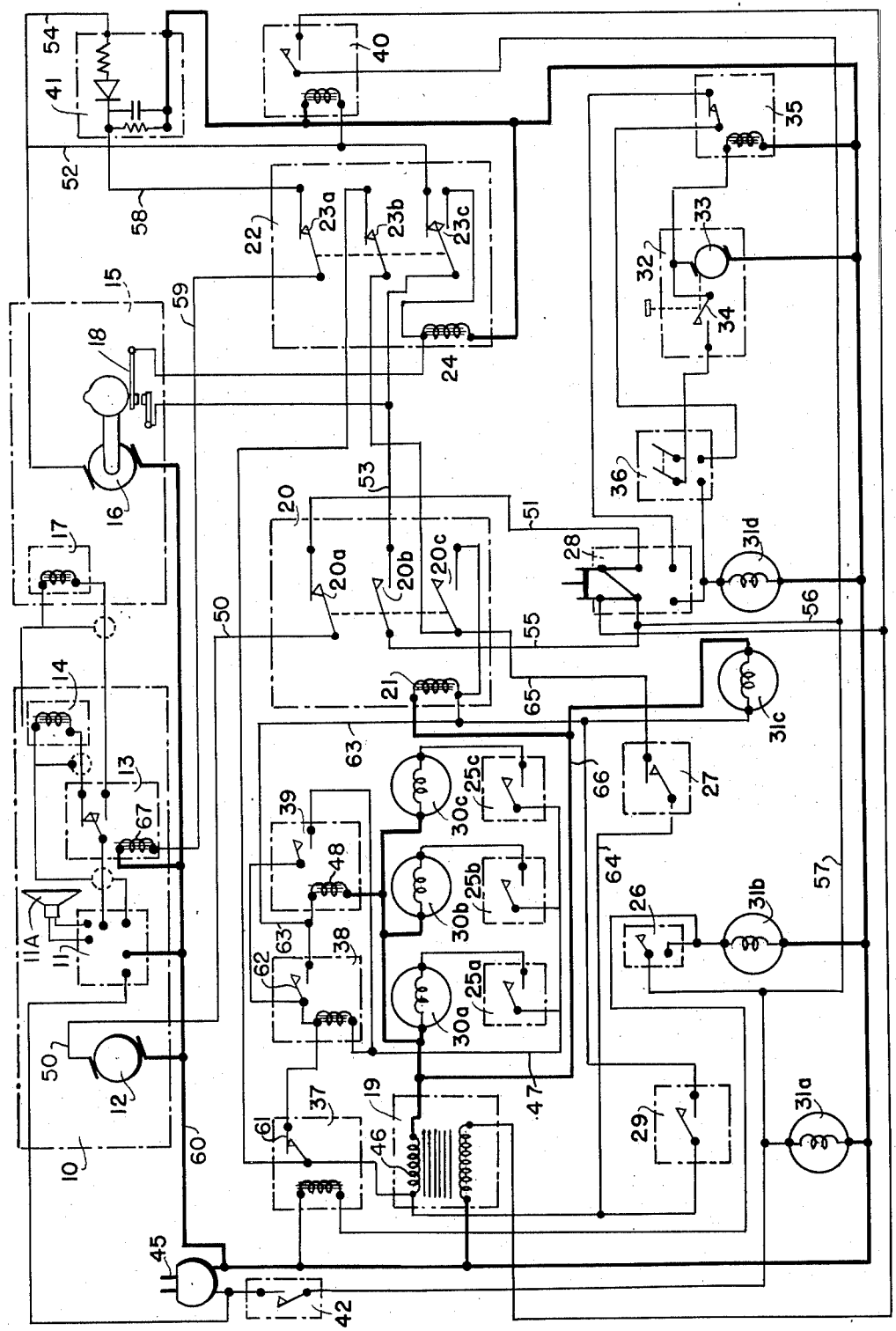

United States Patent Office 2,910,785
Patented Nov. 3, 1959

2,910,785

TEACHING DEVICE

Louis E. Schwartz, Brooklyn, N.Y.

Application January 31, 1955, Serial No. 485,201

6 Claims. (Cl. 35—8)

This invention relates to an educational device and more specifically to an electrically operated teaching aid for stimulating student participation. In the teaching of certain subjects as, for example, the instruction of law students in the fundamentals of the law of evidence, it is highly important that the abstract rules be correlated to the actual application of said rules as they come into effect in actual trial proceedings. Under presently used teaching techniques, it has been found that pupils cannot put to use their knowledge of the law until they have had many years of trial experience.

While the following discussion will be directed toward the instruction of law and more specifically to the course of evidence, it is to be understood that the present apparatus lends itself to the teaching of many other subjects. An important aspect of the law of evidence is to teach the student how to make timely objections during the proceedings of a trial. Failure to make objections promptly and accurately cannot only lose for the lawyer his opportunity to so object, but may seriously damage his case.

Accordingly, it is an object of the present invention to provide an educational device whereby there may be reproduced in the class room, a recorded trial proceeding.

Another object of the present invention is to provide electrical means for interrupting the recorded proceedings for the purpose of student or teacher discussion.

Another object of the present invention is to provide a device whereby a student can register objections to the recorded proceedings in accordance with his knowledge of the subject matter of the course and its application to the information to which he is listening.

A further object of the present invention is to provide a device whereby the instructor can test the knowledge of students by their response to the audible proceedings to which they are listening.

Another object of the present invention is to reproduce for individual student study, certain trial proceedings containing elements pertinent to the course of study.

An object of the invention is to provide means whereby an instructor may register objections to the proceedings being reproduced in the course of examining students who may then be asked to indicate the correctness or basis for said objections.

A feature of the present invention is its switch means for interrupting the recorded presentation for discussion purposes.

Another feature of the present invention is its timing device, whereby an interval may be provided in the playing of the recording, during which students may write down their opinions of what they have heard.

The invention consists of the construction, combination and arrangement of parts, as herein illustrated, described and claimed.

In the accompanying drawings forming a part hereof, is illustrated a schematic showing of a complete embodiment of the present invention.

Referring to the drawings, 10 indicates an audio reproducing device such as a phonograph record player, a tape or wire recording player, or the like. The audio device 10 contains an amplifier 11, a transducer 11A, a motor 12 and a change-over relay 13. One of the contacts of the relay 13 is connected to a first reproducing head 14 which forms part of the audio device 10. A second audio reproducing device 15 is provided in the system and contains a motor 16, a second reproducing head 17 and a switch 18.

The second reproducing head 17 is connected to the other contact of the change-over relay 13 in such a manner that by the operation of the relay, information coming through either the first reproducing head 14 or the second head 17, may be fed into the amplifier 11.

Where legal trial work is the subject matter before the class, the second audio device 15 is arranged to produce only the words "I object" or similar statement. When any one of the students switches 25a, 25b, 25c, or the instructor's switch 29 is closed, the relay 20 is activated. The audio reproducing device 10 is thereby stopped and remains inoperative while at the same time starting the second audio reproducing 15 to reproduce the words "I object." The switch 18 is so constructed that immediately following the reproduction of the words "I object" by the second audio device 15, the said switch 18 will close and activate the relay 22 which stops the operation of the second audio device 15. The closing of the switch 18 is accomplished mechanically by means of a cam on the shaft of motor 16. With both audio reproducing devices 10 and 15 stopped, class room discussion of the objection which has just been heard may take place. The student control switches 25a, 25b, and 25c have associated therewith, a plurality of signal lights 30a, 30b, and 30c, which lights are caused to glow when one or more of the student switches are closed.

The lights 30a, 30b, and 30c, are preferably disposed upon a panel (not shown), which is available to the instructor, and which has the lights 30a, 30b, 30c, disposed thereon in accordance with the seating arrangement of the class. Thus, when a student closes his switch 25, the instructor can immediately know which student desires to comment upon the information which has just been played by the reproducing device 10, by noticing which of the student's lights are on. The operating circuit for the student lights may be traced as follows: From the right hand terminal of the secondary winding 46 of transformer 19, through any one of the lamps 30a, 30b, or 30c, through its associated switch 25a, 25b, or 25c, over conductor 47, through winding 48 of relay 38, then through the contacts 61 of relay 37, and back to the other side of winding 46.

In addition to the student indicating lights 30a, 30b, and 30c, various signal lights indicated at 31a, 31b, 31c, and 31d, in the drawing are incorporated in the circuit for the purpose of keeping the instructor advised as to the operation or interruption of the various elements of the system.

An electrical timing device 32 may be included in the circuit for the purpose of interrupting for a given interval of time, the information being given the class by the audio reproducing device 10. The timing device 32 may consist of an electric motor 33 having associated therewith a clutch and spring mechanism (not shown) which is adapted to drive an adjustable cam which at a preset time interval, when the motor 33 is energized, opens an associated switch 34 which switch is so arranged that once closed by the instructor, remains closed until it is opened by the cam action. The cam then returns to its normal position. During the interval when the audio device 10 is silent, students may be called upon to write down upon an examination paper, their estimate of the proceedings which they have just heard.

If the instructor throws the switch 28 to a position opposite to that shown in the drawing, he can interrupt both audio devices 10 and 15, in which event the signal light 31d will glow and remain lighted until the position of the switch 28 is reversed. These circuits may be traced from supply line 60 to motor 12, then over conductor 50, through contacts 20a, conductor 51, to the right hand blade of switch 28 which is in its lower position and is connected through the contacts of relay 35 and an open terminal of switch 36. Audio device 15 is interrupted because its power supply includes conductor 52, contacts 23c, and conductor 53 which is connected to open contacts 20b. With the switch 28 in a position opposite that shown in the drawing, the instructor may close the switch 36 which is connected to the timing device 32. The timer 32 in turn controls relay 35. When the instructor closes the switch 34 by hand the timing device 32 is brought into operation.

If the instructor wishes to disconnect the student switches 25a, 25b, 25c, etc., he may do so by closing the single pole single throw switch 26 which is available to him and which is preferably mounted upon his panel. When the student switches are disconnected, the signal light 31b, which is in series with the switch 26, will glow and remain lighted until the switch 26 is again opened.

When the student switches are cut off, the audio reproducing devices 10 and 15 can nevertheless be controlled by the instructor, who may, for example, close his switch 29 for the purpose of stopping the first audio device 10 and causing the second audio device 15 to reproduce the words "I object."

The power for the various elements in the system is taken from a power source indicated at 45 and also from a step-down transformer 19. A main switch 42 is inserted in the power line. A rectifier, indicated at 41, is connected to the main source of alternating current power by conductors 54 and 52, contacts 23c, conductor 53, contacts 20b (when closed), and conductors 55, 56, and 57. This rectifier circuit produces direct current on conductor 58 which is connected through contacts 23a and conductor 59 to winding 67 of relay 13. The step-down transformer 19 has its secondary winding 46 connected to several circuits. One of these circuits is controlled by contacts 61 and lights the student lamps as described above. Another circuit, controlled by contacts 62 on relay 38, operates relay 21.

In operating the system, the instructor closes the main switch 42 which supplies power for the whole system and which will cause the signal light 31a to glow and remain lighted as long as switch 42 is closed. Closing the switch 42 also causes audio reproducing device 10 to start and operate until interrupted, either by a student using a switch 25 or by the instructor employing one of the switches previously described. The operating circuit for motor 12 may be traced from conductor 60, through the motor 12, over conductor 50, through contacts 20a, over conductor 51, through the right hand blade of switch 28, over conductors 56 and 57 to switch 42, and the other side of the supply line. Upon such interruption of audio device 10, the second audio device 15 automatically comes into operation and reproduces the words "I object" and stops. Thereafter, both audio devices will remain silent until the instructor starts audio device 10 again by momentarily opening switch 27 which normally remains in a closed position. The operating circuit for audio device 15, includes conductor 60, motor 16, conductor 52, contacts 23c, conductor 53, contacts 20b, and conductors 55, 56, and 57. When any one of the students closes switches 25a, 25b, or 25c, current passes through winding 48 closing contacts 62, and sending current from the left side of winding 46, through contacts 61, and 62, over conductor 63, through winding 21 of relay 20, actuating the relay contacts and starting motor 16. The motor turns enough to reproduce "I object," then the mechanical coupling (which may be a cam on the motor shaft) closes switch 18 and actuates relay 24, operating contacts 23c and stopping the motor. Relay 21 includes a holding circuit with contacts 20c so that when the relay is operated by the closure of a switch 25, the relay 20 remains in its actuated condition. This holding circuit may be traced from the left side of winding 46, over conductor 64, normally closed contacts 27, conductor 65, closed holding contacts 20c, winding 21, conductor 66, and back to the other side of winding 46. The relay 20 is normalized by the instructor by the momentary opening of switch 27. As soon as this occurs audio device 10 starts.

It is within the purview of the present invention to employ a single audio device 10 which is capable of reproducing not only the educational information but also an audible signal such as the words "I object," a sustained tone or the like. Upon the playing of said signal, the switch 18 which is responsive thereto as previously described, will interrupt the current flowing to the said audio device 10. The switch 18 will also start the timer 32, which timer will operate during a preset interval. The length of the interval can be governed to enable students to answer a question before them on the intelligence which they have just received from the reproducing device 10. At the end of the interval the timer 32 may be employed to restart the audio reproducing device 10 which will then operate until stopped by the operation of relay 20. In this manner, the apparatus shown in the drawings can be completely automatic and the instructor can devote his attention to other matters during the examining period.

From the foregoing it will be seen that there has been provided a highly flexible teaching aid whereby an instructor may provide his students with educational material and the opportunity to participate in the analysis of said material within the confines of a class room.

Having thus fully described the invention, what is claimed as new and desired to be secured by Letters Patent of the United States is:

1. An electrically operated teaching aid comprising, a first audio reproducing device operated by a first electric motor and adapted to deliver a first series of audible signals, a second audio reproducing device operated by a second electric motor and adapted to deliver a second series of audible signals, circuit means connected to both reproducing devices which prevents their simultaneous operation, a first switch means available to any one of a plurality of students to stop the first audio device and to start the second audio device, a second switch means connected to the second audio device and responsive to the mechanical movement produced by the operation of the second motor to stop the second motor after a predetermined movement of the motor shaft, and instructor control means for normalizing the entire circuit and for starting the first audio device.

2. An electrically operated teaching aid comprising, a first audio reproducing device operated by a first electric motor and adapted to deliver a first series of audible signals, a second audio reproducing device operated by a second electric motor and adapted to deliver a second series of audible signals, circuit means connected to both reproducing devices which prevents their simultaneous operation, switch means available to any one of a plurality of students to stop the first audio device and to start the second audio device, signal lamps available to an instructor which denote the identity of the student who operated said switch means, additional switch means connected to the second audio device and responsive to the mechanical movement a predetermined movement of the motor shaft and to stop the second audio device after delivering a predetermined signal, and control means available only to the instructor for normalizing the entire circuit and for starting the first audio device.

3. An electrically operated teaching aid comprising, a first audio reproducing device operated by a first electric motor and adapted to deliver a first series of audible signals, a second audio reproducing device operated by a second electric motor and adapted to deliver a second series of audible signals, circuit switching means connected to both reproducing devices which prevents their simultaneous operation, said circuit means including a relay with one pair of contacts in series with said first motor and another pair of contacts in series with said second motor, a plurality of switch means available respectively to any one of a plurality of students to stop the first audio device and to start the second audio device, additional switch means connected to the second audio device and responsive to the mechanical movement produced by the operation of the second motor to stop the second motor after a predetermined movement of the motor shaft and after delivering a predetermined signal, and control means available only to the instructor for normalizing the entire circuit and for starting the first audio device.

4. An electrically operated teaching aid as set forth in claim 3 wherein the operated position of all of said switches is indicated by signal lamps.

5. An electrically operated teaching aid as set forth in claim 3 wherein additional control means are available for the instructor to stop both motors and disable both first and second reproducing devices.

6. An electrically operated teaching aid as set forth in claim 3 wherein said additional switch means includes a cam on the shaft of said second motor and a switch in series with a relay winding.

References Cited in the file of this patent

UNITED STATES PATENTS

| | | |
|---|---|---|
| 2,245,762 | De Stefani et al. | June 17, 1941 |
| 2,514,289 | Nye et al. | July 4, 1950 |
| 2,611,619 | Cambron | Sept. 23, 1952 |
| 2,764,639 | Holt | Sept. 25, 1956 |
| 2,777,901 | Dostert | Jan. 15, 1957 |

FOREIGN PATENTS

| | | |
|---|---|---|
| 663,790 | Great Britain | Dec. 27, 1951 |